United States Patent [19]

Nemec et al.

[11] Patent Number: 4,815,344
[45] Date of Patent: Mar. 28, 1989

[54] CONTROL MECHANISM OF A BOLT STRESSING UNIT

[75] Inventors: Petr Němec, Tlučná; Josef Pěnkava, Plzeň, both of Czechoslovakia

[73] Assignee: Skoda, koncernovy podnik, Pilsen, Czechoslovakia

[21] Appl. No.: 41,178

[22] Filed: Apr. 22, 1987

[30] Foreign Application Priority Data

Apr. 22, 1986 [CS] Czechoslovakia .................. 2888-86

[51] Int. Cl.$^4$ ............................................. B25B 29/02
[52] U.S. Cl. .................................... 81/57.38; 29/452; 29/525.1; 254/29 A
[58] Field of Search .................... 29/726, 452, 526 R; 81/57.38; 254/29 A

[56] References Cited

U.S. PATENT DOCUMENTS

| | | | |
|---|---|---|---|
| 3,015,975 | 1/1962 | Biach | 81/57.38 |
| 3,722,332 | 3/1973 | Jones | 81/57.38 |
| 3,844,533 | 10/1974 | Markiewicz | 254/29 A |
| 3,877,326 | 4/1975 | Kock et al. | 81/57.38 |
| 4,027,559 | 6/1977 | Wallrafen | 81/57.38 |
| 4,047,456 | 9/1977 | Scholz | 81/57.38 |
| 4,223,575 | 9/1980 | Krueger | 81/57.38 |
| 4,273,011 | 6/1981 | Exner et al. | 81/57.38 |
| 4,569,258 | 2/1986 | Orban | 254/29 A |

*Primary Examiner*—Charlie T. Moon
*Attorney, Agent, or Firm*—Klein & Vibber

[57] ABSTRACT

The invention concerns a control mechanism designed for manipulation with a stressing rod of a stressing unit which is used for fastening and prestressing of bolts, e.g. for flange joints of large pressure vessels, especially for flange joints of nuclear reactor vessels. The drive of the control mechanism of the stressing unit is a pseudoplanetary system of a gear mechanism which has the ability of both manual and mechanical control. A crown gear wheel is equipped with outer teeth and inner teeth. An inserted gear wheel of a driving pinion mates with the outer teeth. Only three planet gear wheels are inserted between the inner teeth of the crown gear wheel and the outer spur teeth of a central gear wheel. The central gear wheel is formed into the shape of a cylindrical shell which is bedded by its lower side, having a certain radial move possibility, on a wire bearing placed on a carrying body. A further part of the control mechanism forms a joint between the central gear wheel and the stressing rod which is equipped in its lower part with an inner thread corresponding to an auxiliary thread of a flange bolt, is relieved by a compensating spring leaning against the face of a supporting nut which revolves together with the stressing rod on a suspension bolt which has the same lead as the auxiliary thread of the flange bolt.

6 Claims, 2 Drawing Sheets

CONTROL MECHANISM OF A BOLT STRESSING UNIT

FIELD OF THE INVENTION

The invention concerns a control mechanism designed for manipulation with a stressing rod of a stressing unit used for prestressing of bolts, e.g. for flange joints of nuclear reactor vessels.

BACKGROUND OF THE INVENTION

Several control mechanisms of different design are used for manipulation with the stressing rod of stressing units. Most frequently, a balancing of the stressing rod by means of a counterweight suspended on a chain or a rope led over pulleys is used. Sometimes a pulley block, a hydraulic or pneumatic cylinder can be used instead of the counterweight. A direct connection of the stressing rod with a hand-operated wheel is mostly used for rotating this rod.

A considerable mass (up to the hundreds of kilograms), an enlarged construction height and increased inertial dynamic effects are disadvantages of the stressing unit containing the rod balanced by means of a counterweight. The necessity of controlling the revolving of the stressing rod which is parallel to the functional pulley block parts is a disadvantage of the pulley-block system. The use of hydraulic and pneumatic cylinders increases the construction height and complicates the design of the controlling system for the distribution of pressure medium, the distribution itself so as the regulation of the pressure medium distribution. When using the rotation of the stressing rod by means of a hand-operated wheel, it is necessary to take into account a changed built-up area for screwing the stressing rod onto the stressed bolt, no gear ratio being usable for the revolving in order to reach the necessary rotation moment.

SUMMARY OF THE INVENTION

The present invention eliminates the aforesaid drawbacks. The mechanism comprises a stressing unit body, a stressing rod, gears, a clutch and a suspension bolt with a supporting nut, a carrying body, a compensation spring and joint means. The invention creates a pseudo-planetary wheel system for drive of the control mechanism, this being reached by a gear wheel inserted between the outer teeth of a annulus wheel and a driving pinion, only three planet wheels being inserted between the inner teeth of the annulus wheel and the outer spur teeth of the sun wheel. Shafts of the planet wheels are bedded in a cover and in a carrying body lying on the upper surface of an annular piston. This annular piston is equipped with a spherical cavity in its upper surface, a spherical cushion lying in it, a flange of the stressing rod being in contact with the upper surface of the cushion in the lower position.

The stressing rod is equipped with a cavity, a clutch bush with a collar having a ring cushion being inserted into this cavity, the ring cushion having a radial groove in its lower side and being equipped with two opposite blocks arranged on the circumference. Radial feathers fit into the radial groove, the feathers being situated in the flange face of the stressing rod.

A shank of the suspension bolt is inserted into a central opening made in the cover, the suspension bolt being situated in the vertical axis of the control mechanism. The shank reaches with its guiding thread into the cavity of the clutch bush and further into the cavity of the stressing rod where it is equipped with a supporting nut, the nut having longitudinal feathers in the outer circumference. A compensating spring is inserted between the supporting nut and the bottom of the clutch bush.

The rim of the sun wheel is formed on a cylindrical shell which is bedded by its lower part in a ball bearing, the bedding being provided with a certain radial moving ability, the ball bearing being situated in the internal circumference of the carrying body, the cylindrical shell reaching with its upper edge into a cavity made inside the cover, radial groove guides for the blocks being arranged on the surface of an inner bore of the cylindrical shell. The sun wheel, the carrying body, the annulus wheel, the clutch bush, the stressing rod, the suspension bolt and the supporting nut are arranged co-axially to the central axis of the control mechanism.

A space bush is situated on the guiding thread of the suspension bolt between the supporting nut and the clutch bush. A hand-operated wheel is joined to the annulus wheel, the shaft ends of the planet wheel shafts being elongated over the bedding in the cover into prism outlets of a manual drive, the outlets going through the cover. The leads of an auxiliary thread provided on a flange bolt, of an inner thread provided in the stressing rod and of the supporting nut thread so as of the guiding thread of the suspension bolt are the same.

Advantages of the inventive control mechanism of the stressing unit result especially from the use of the pseudo-planetary gear system for the rotation of the stressing rod. The height of the stressing unit is reduced and a constant height of the hand-operated wheel is ensured. The ability to select the gear ratio of the rotation of the stressing rod according to the friction value in the auxiliary thread of the flange bolt and the ability to use a motor for revolving of the stressing rod represent further advantages of the invention. Moreover, the stressing unit has a reduced weight and a more simple control than the hitherto known stressing units.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figure 1:
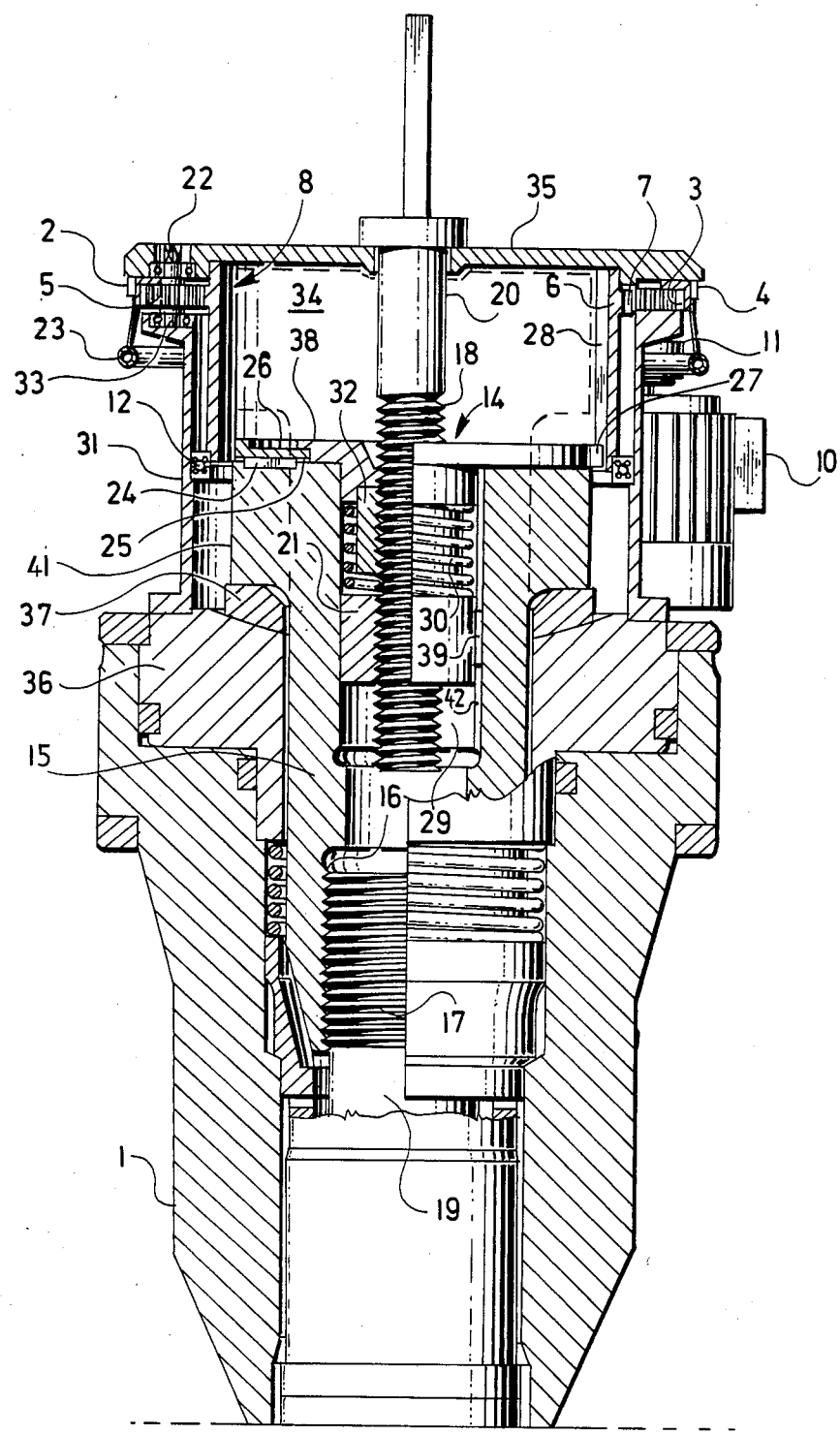
FIG. 1 is a sectional front view of the mechanism.
Figure 2:
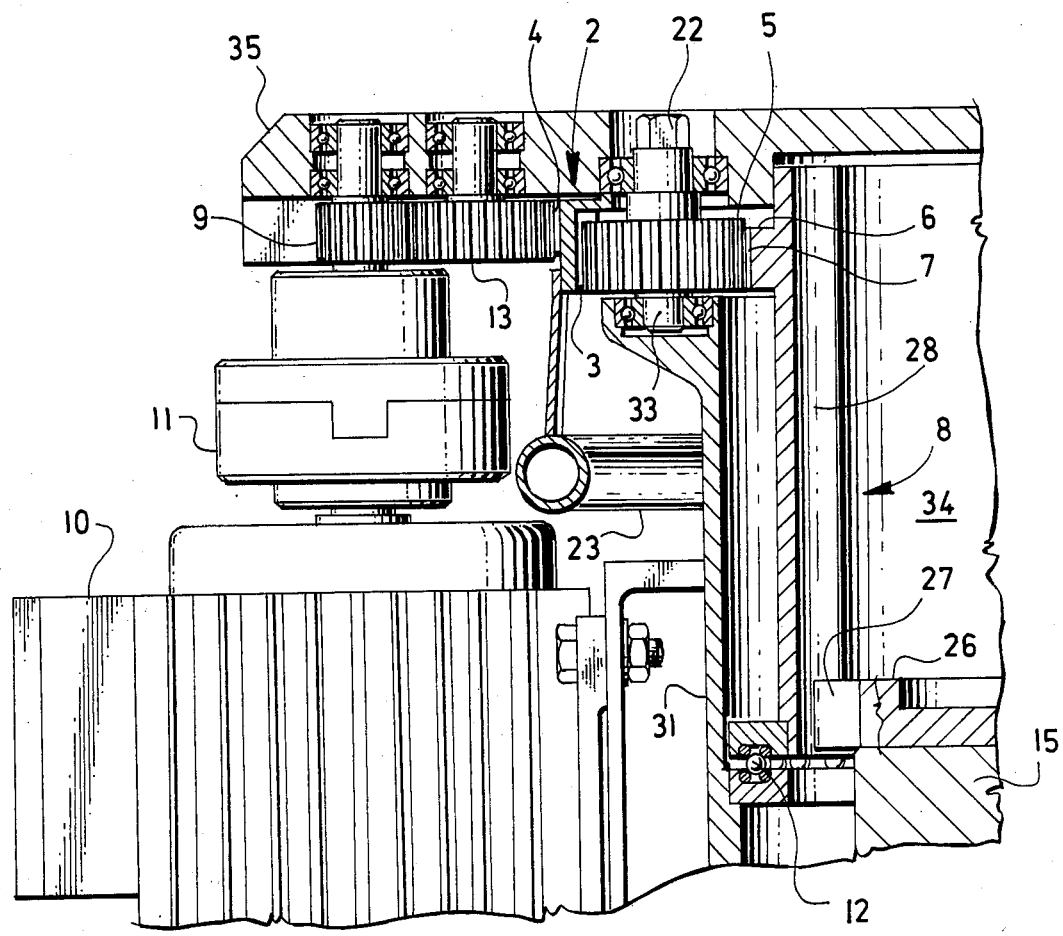
FIG. 2 is a front view, partially in section, of a detail showing the arrangement of driving mechanical parts.

As shown in FIGS. 1 and 2, the control mechanism of the stressing unit comprises a driving pinion 9, the shaft of which is bedded in bearings arranged in a cover 35 and joined by means of a coupling 11 to a motor 10. The driving pinion 9 mates with the teeth of an intermediate wheel 13. The inserted gear wheel 13 is fastened to a shaft also bedded in bearings situated in cover 35. The teeth of this intermediate wheel 13 mate also with the outer teeth 4 of a annulus wheel 2, a narrow rim of which is bedded on a flange of a hollow carrying body 31.

A hand-operated wheel 23 is attached to the annulus wheel 2. Only three plate wheels 5 mate with the inner teeth 3 of this annulus wheel 2, the shafts 33 of the planet wheels 5 being bedded, on their upper sides, in bearings situated in the cover 35 and, on their lower sides, in bearings situated in the flange of the carrying body 31. Free ends of the shafts 33 are elongated and formed as hexagonal prism outlets 22 for a hand-rotated wrench. The planet wheels 5 mate also with outer spur teeth 7 made on a sun wheel 6. The sun wheel 6 is hollow and is inserted in an upper space of a cavity made in the carrying body 31 and reaches to a cavity provided in the cover 35.

The rim of the sun wheel 6 is formed on a cylindrical shell 8 which reaches approximately to the half of height of the cavity made in the carrying body 31. The lower part of this cylindrical shell 8 is arranged as a step which is inserted, having a small radial move possibility, into an upper ring of a ball bearing 12, the lower ring of this ball bearing 12 being pressed into a step made in the cavity of the carrying body 31. The possibility of a radial move of the sun wheel 6 ensures the static determination of the pseudo-planetary system when the gear wheels are mating together.

The inner cavity surface of the cylindrical shell 8, i.e. an inner bore 34 is equipped with radial groove guides 28. Two opposite blocks 27 reach into groove guides 28, the blocks 27 being attached to a ring cushion 26 which is joined in its lower part to the flange face of a stressing rod 15 by means of a radial groove 25 and radial feathers 24 bedded in the flange face of the stressing rod 15.

A collar 38 is fixed in the upper part of a clutch bush 14, a cavity for the ring cushion 26 being arranged in it. A cavity for a space bush 32 is arranged inside and the lower part of the clutch bush 14. The clutch bush 14 and the space bush 32 are shifted on suspension bolt 20 and are inserted into a continuous axial bore 29 made in the stressing rod 15. The suspension bolt 20 is equipped with a guiding thread 18, the lead of which is the same one as inner thread 16 of the stressing rod 15 and auxiliary thread 17 of flange bolt 19.

A supporting nut 21 is screwed onto guiding thread 18, a compensating spring 30 being in contact with the supporting nut 21. The compensating spring 30 leans by its second end against the lower face of the clutch bush 14. The supporting nut 21 is connected to the inner side of the stressing rod 15 by means of longitudinal feathers 39 shifted in grooves 42 which are formed in the wall of the axial bore 29. The lower peripheral flange surface of the stressing rod 15 is pressed against a spherical cushion 37, the spherical lower surface of which lies in a corresponding spherical cavity 40 made in the upper surface of an annular piston 30. A flange of the lower part of the carrying body 31 lies on the upper surface of the annular piston 36. The annular piston 36 is hollow and the shank of the stressing rod 15 goes through it. The control mechanism of the stressing unit is inserted into the stressing unit body 1 in the space beginning from the level of the upper edge of the annular piston 36 to the surface of the flange connection.

FIG. 1 shows the control mechanism of the stressing unit in the position when the stressing rod 15 is screwed on the auxiliary thread 17 of the flange bolt 19 and leans by its flange 41 against the spherical cushion 37 of the annular piston 36. It is possible to prestress the flange bolt 19 in this position by a pressure medium led under the annular piston 36. It is possible, the pressure being removed to screw off the stressing rod 15 from the flange bolt 19 until under the cover 35 (the position being marked by phantom lines) and the whole unit can be replaced onto a further bolt.

By rotating the annulus wheel 2 by means of the hand-operated wheel 23 or the motor 10 with the coupling 11, the driving pinion 9 and the intermediate wheel 13 begin to rotate, the sun wheel 6 rotating by means of the planet wheels 5, as well. The radial groove guide 28 of this sun wheel 6 takes the blocks 27 of the ring cushion 26 with it, the ring cushion 26 turning by means of the radial groove 25 and of the radial feathers 24 the stressing rod 15. The stressing rod 15 executes a screw motion. The clutch bush 14, the space bush 32, the compensating spring 30 and the supporting nut 21 revolve together with the stressing rod 15 on the immovable suspension bolt 20.

Since the lead of the guiding thread 18 (the supporting nut 21 being movable on it) is the same one as the lead of the inner thread 16 of the stressing rod 15, the relative position of the supporting nut 21 with respect to the stressing rod 15 is conserved even after the stressing rod 15 being screwed off the auxiliary thread 17 of the flange bolt 19. This is made possible also by the fact that the mass of the stressing rod 15 is balanced by the compensating spring 30 which compensates the lead errors of the threads 16, 17, 18. When the collar 38 leans against the cover 35, the screwing-off of the stressing rod 15 is finished and the control mechanism of the stressing unit is ready to replace the stressing unit on a further bolt. This is executed in such a way that a not shown lifting mechanism lifts the stressing unit by grasping it on the suspension bolt 20. This causes the compensating spring 30 to be pressed, the supporting nut 21 leans against the space bush 32 and the whole stressing unit is lifted by means of the cover 35 and the carrying body 31.

It is also possible to revolve directly the prism outlets 22 of the planet wheels 5 when screwing-off the stressing rod 15, the torsional moment being several times higher by this circumstance. An eventual non-alignment of the stressing rod 15 and the sun wheel 6 is compensated by the ring cushion 26 which has two degrees of freedom in radial direction.

We claim:

1. A control mechanism of a bolt stressing unit having a stressing unit body and a stressing rod for stressing a flange bolt having an auxiliary thread, said mechanism comprising:
    an annular piston, having an upper surface, mounted in said unit body, said annular piston being provided with a spherical cavity on its upper surface, an annular cushion resting in said spherical cavity;
    said stressing rod being provided with a flange and an axial bore, said flange having an upper and a lower surface, said stressing rod being centrally mounted in said annular piston, the lower surface of said flange resting on top of said annular cushion;
    said stressing rod also being provided with an inner thread for engaging the auxiliary thread of the flange bolt to be stressed;
    an annular clutch bush, having a collar and a ring cushion 26, said clutch bush being inserted into said axial bore of said stressing rod and lying on top of the upper surface of said flange;
    said ring cushion being provided with a radial groove and two opposite blocks on its circumference;
    radial feathers placed on the upper surface of said flange engaging said radial groove of said ring cushion;

a cylindrical carrying body lying on the upper surface of said piston and a cover lying on top of said carrying body, said cover having a central opening;

an immovable suspension bolt passing through the central opening of said cover and extending through said clutch bush into the axial bore of said stressing rod 15, said suspension bolt being provided with a guiding thread, said guiding thread freely engaging said clutch bush 14 and a space bush, and carrying a supporting nut;

said supporting nut being provided with longitudinal feathers engaging said grooves the interior of said axial bore;

a compensating spring, located between said supporting nut and said clutch bush;

an annulus wheel, three planet wheels, and a sun wheel, said annulus wheel being provided with outer teeth and inner teeth, said sun wheel being provided with spur teeth, said planet wheels placed between and engaging the inner teeth of said annulus wheel and the spur teeth of said sun wheel, said sun wheel engaging said blocks on the circumference of said ring cushion;

an intermediate wheel and a driving pinion, said intermediate wheel operatively engaging the outer teeth of said annulus wheel and said driving pinion;

each of said annulus wheel, three planet wheels, intermediate wheel, and driving pinion being carried by a respective shaft, each shaft being bearingly mounted in said cover, the shafts of said planet wheels also being bearingly mounted in said carrying body;

whereby rotation of the driving pinion drives intermediate wheel which rotates annulus wheel and planet wheels and sum wheel, thereby turning ring cushion, which by its radial groove turns stressing rod.

2. A control mechanism as claimed in claim 1 further comprising:

said sun wheel being formed on the exterior surface of a cylindrical shell, said cylindrical shell bearingly mounted on carrying body;

said cylindrical shell being provided with radial groove guides formed on its interior surface, said groove guides engaging said blocks;

the sun wheel, the carrying body, the annulus wheel, the clutch bush, the stressing rod, the suspension bolt and the supporting nut being arranged co-axially.

3. A control mechanism as claimed in claim 2 further comprising:

a space bush is placed on the guiding thread of the suspension bolt between the supporting nut and the clutch bush.

4. A control mechanism as claimed in claim 2 further comprising:

a hand-operated wheel joined to the annulus wheel, the ends of the shafts of the planet wheels being elongated on the cover side into prism outlets of a manual drive.

5. A control mechanism as claimed in claim 3 further comprising:

said auxiliary thread of flange bolt, said inner thread of stressing rod and said guiding thread of suspension bolt and of supporting nut have the same lead.

6. A control mechanism as claimed in claim 2 further comprising:

said cylindrical shell, bearingly mounted on said carrying body by means of a ball bearing.

* * * * *